July 7, 1936.     L. E. LA BRIE     2,046,420
BRAKE
Filed July 30, 1932     3 Sheets-Sheet 1

INVENTOR.
LUDGER E. LA BRIE
BY
ATTORNEY

July 7, 1936.  L. E. LA BRIE  2,046,420
BRAKE
Filed July 30, 1932  3 Sheets-Sheet 2
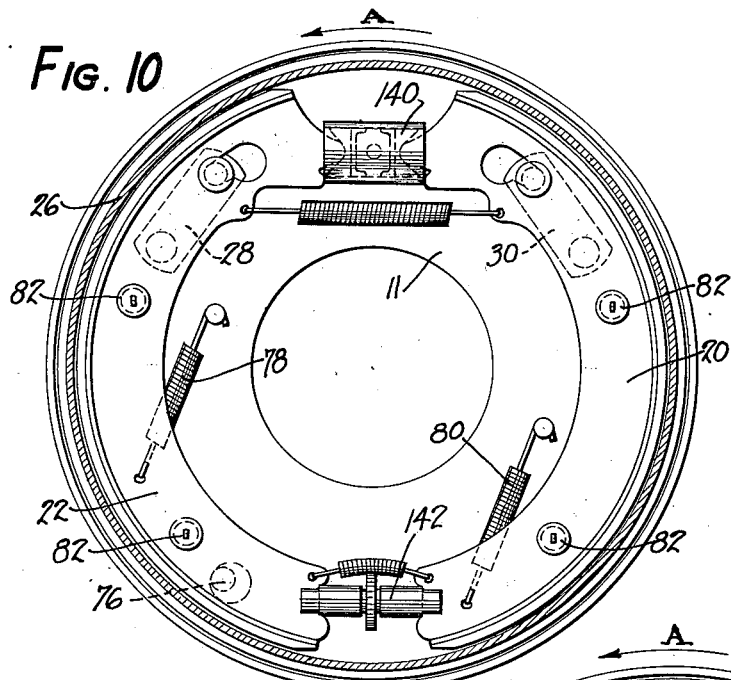
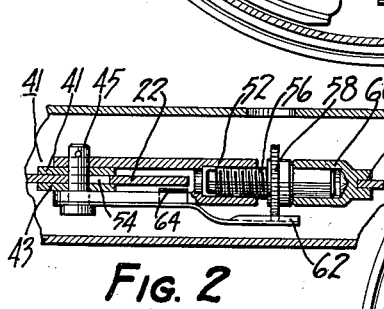
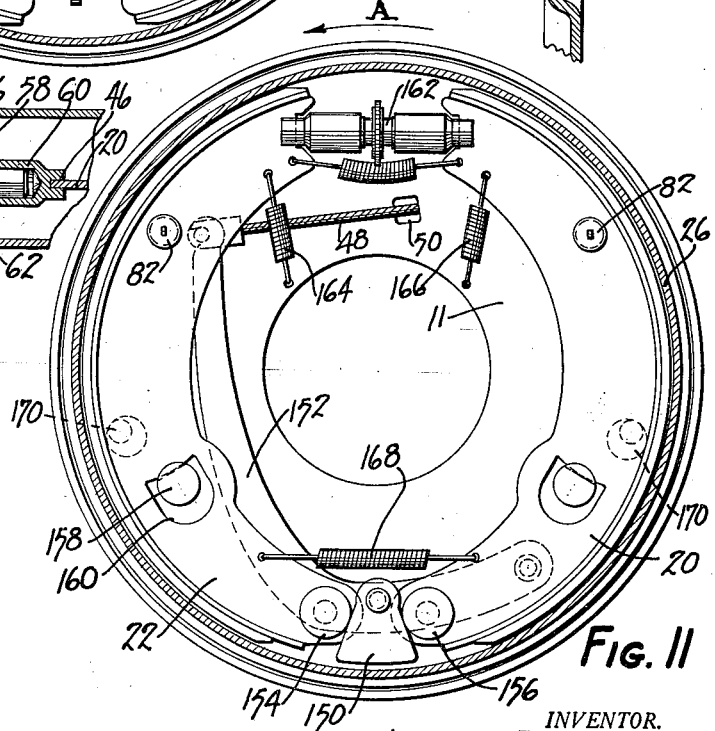
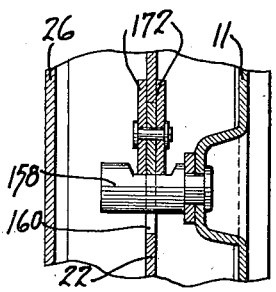
INVENTOR.
LUDGER E. LA BRIE
BY J. P. Keiper
ATTORNEY July 7, 1936.  L. E. LA BRIE  2,046,420
BRAKE
Filed July 30, 1932   3 Sheets-Sheet 3
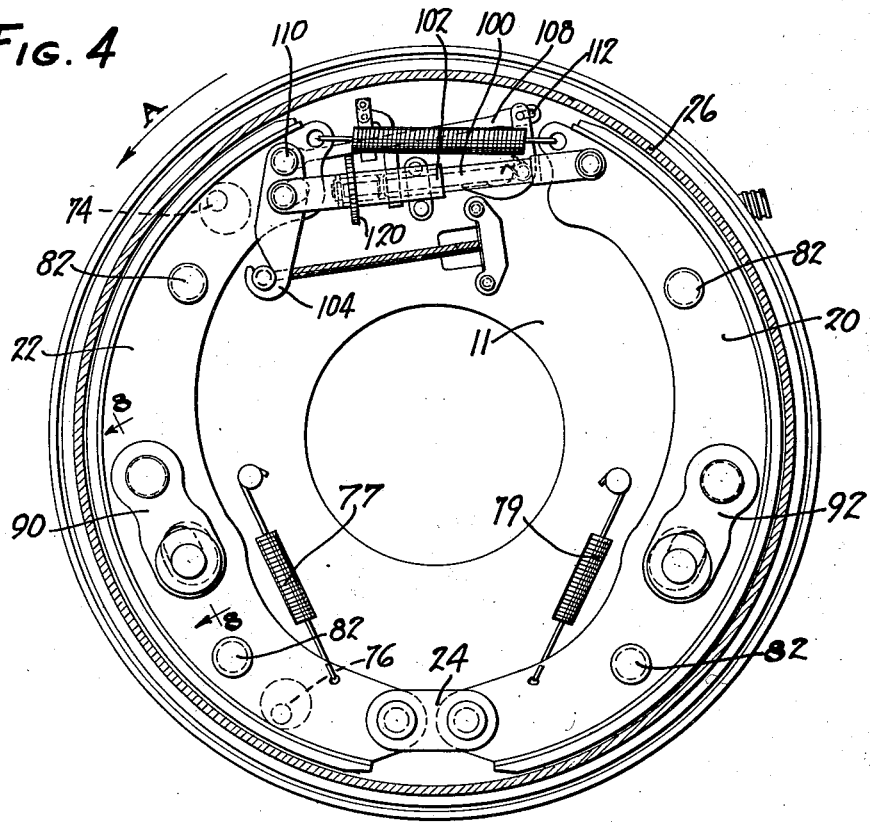
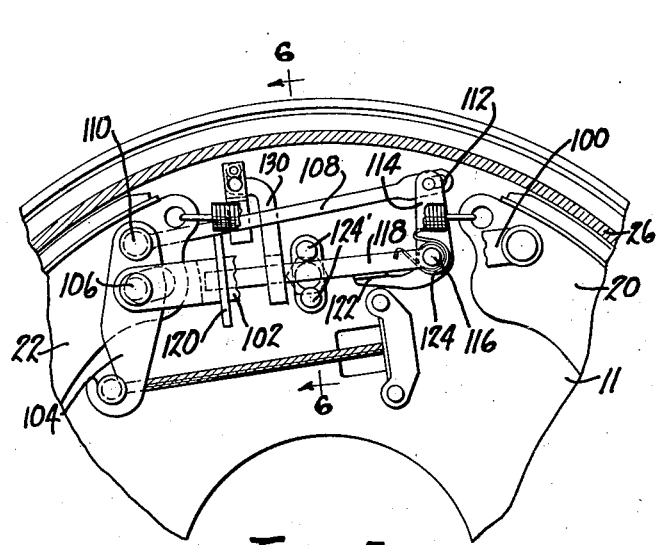
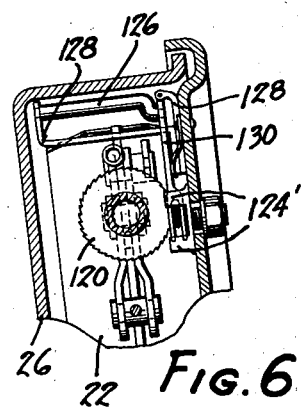
INVENTOR.
LUDGER E. LA BRIE
BY J. P. Keiper
ATTORNEY.

Patented July 7, 1936

2,046,420

UNITED STATES PATENT OFFICE 2,046,420

BRAKE

Ludger E. La Brie, South Bend, Ind., assignor to Bendix Aviation Corporation, South Bend, Ind., a corporation of Delaware Application July 30, 1932, Serial No. 626,423

12 Claims. (Cl. 188—78)

This invention relates to brakes and more particularly to those of the internal expanding type.

In the usual internal brake of the self-actuating type which are more or less symmetrical and have similar braking characteristics for both directions of brake rotation, difficulty is encountered in that the arcuate length of self energizing braking shoe is nearly 360 degrees and as a result thereof a higher degree of self-actuation is obtained than can accurately be controlled. The other extreme is experienced in a conventional two shoe brake wherein a pair of shoes pivoted at one end are expanded at the other end. In such a brake, one shoe has a self-energizing tendency whereas the other shoe is deenergized, the resultant self-actuating characteristic thereby being substantially neutralized.

For ease of braking, it is desirable that a certain amount of self-energization be provided, but a brake having nearly a 360 degree shoe contact anchored at one end thereof is likely to be too sensitive and uncontrollable. With this view in mind, the present invention is directed to a brake wherein a pair of linked shoes are adapted to anchor at their mid points, one shoe of which may act as a servo shoe which may energize the secondary shoe, which being anchored at a central point does not act as a self-actuating shoe, but merely as a neutral shoe. Such a construction combines the smoothness of the two shoe type of brake together with a certain amount of the self-energizing characteristics of a servo brake, together with having the advantage of substantially uniform action for either direction of rotation, and a more even distribution of the braking pressures.

Certain details of construction, including more even wear around the braking surface, due to better distribution of pressures, an anchor requiring no adjustment throughout its life, and friction shoes which retain anchor engagement until their floating direction is determined by frictional contact, permit the use of a novel automatic adjustment mechanism, and various novel forms of actuating mechanism, particularly a hydraulic servo brake where closeness of clearance adjustment is not a requirement in preventing undue shifting of the anchor under load.

It is accordingly, an object of this invention to provide a brake incorporating the smoothness of the two shoe brake and a certain amount of the self energizing characteristics of the servo type of brake.

Another object of the invention is to provide a brake having a servo shoe linked to a shoe, anchored at a point centrally located, whereby the secondary shoe is neutral and yet energized by the servo shoe.

A further object of the invention is the provision of anchoring means adapted to provide instantaneous release characteristics of the brake.

Still another object of the invention is the provision of means for retaining the floating friction element in engagement with both anchors until initial friction contact with the drum.

Another object of the invention is the provision of a novel wedge actuating mechanism for such a brake.

A still further object of the invention is the provision of a brake requiring no anchor adjustment during its life.

A still further object of the invention is the provision of a brake utilizing clearance adjustments only and which is self-centering during operation.

Another object is the provision of a brake adapted to have an even distribution of contact pressure whereby the brake lining may wear equally on servo and secondary shoes.

A still further object of the invention is the provision of automatic adjustment means adapted to compensate for wear having provision for maintaining the increment of adjustment uniform and for preventing adjustment during abnormal heat of the brake.

The above and other novel features of the invention will appear more fully hereinafter from the following detailed description when taken in connection with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views:

Figure 2 is a section through the line 2—2 of Figure 1 showing the adjustment thereof.

Figure 3 is a section through an anchor of Figure 1 taken on the line 3—3 of Figure 1.

Figure 4 is a front elevation partly in section of a modified form of the brake of Figure 1 adapted for automatic adjustment;

Figure 5 is an enlarged portion of Figure 4 partially cut away illustrating the automatic adjustment mechanism;

Figure 8:
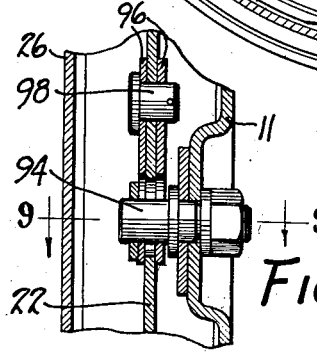
Figure 7:
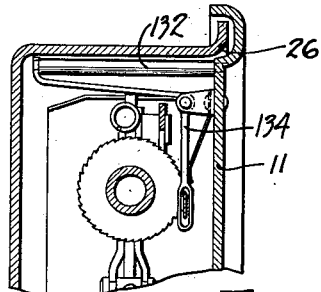
Figure 9:
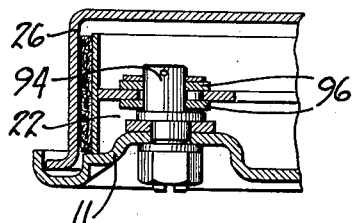

Figure 6 is a section taken on the line 6—6 of Figure 5;

Figure 7 is an alternative structure for that shown particularly in Figure 6;

Figure 8 is a section taken on line 8—8 of Figure 4 illustrating the form of anchor therein shown;

Figure 9 is a section of Figure 8 taken on the line 9—9;

Figure 10 is a modified form of brake adapted for hydraulic operation;

Figure 11 is a modified form having a wedge cam actuator;

Figure 12 is a modified form of anchor similar to that illustrated in Figure 11.

Figure 1:
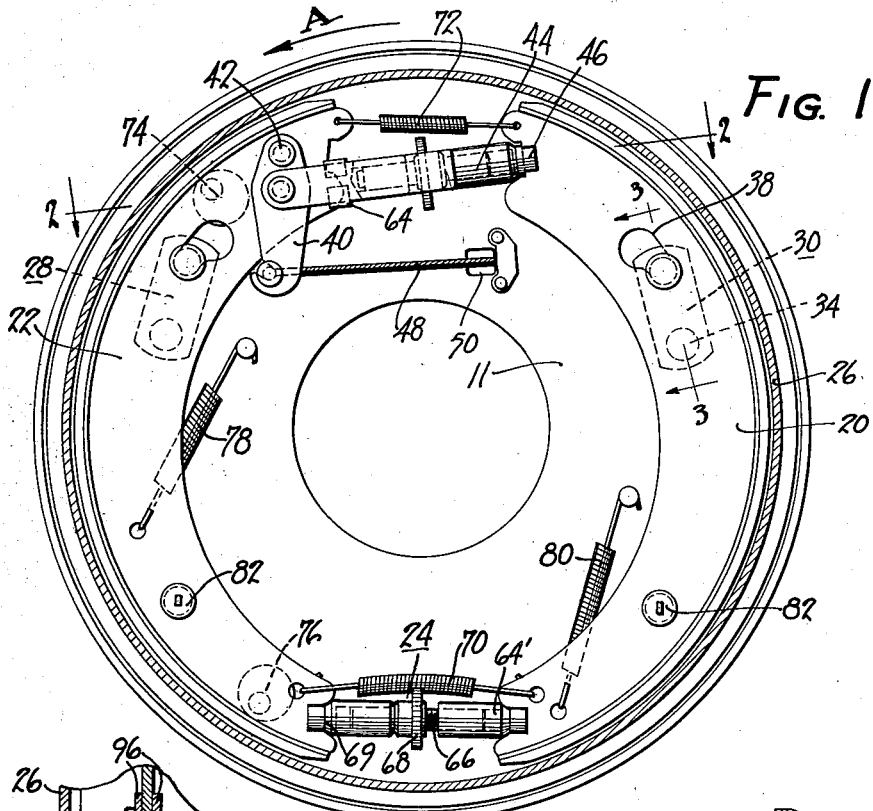
Figure 1 is a front elevation partly in section of a brake showing a preferred form of the invention.

Referring more particularly to Figure 1, there is shown therein a brake having a pair of shoes 20 and 22 adjustably linked together at 24 and adapted to engage a brake drum 26. Anchors 28 and 30 are provided intermediate the ends of the shoes and are adapted to take the braking torque. As best shown in Figure 3, each anchor comprises a cranked member 32 pivoted to the backing plate at 34 and carrying upon its cranked end, a groove 36 adapted to fit the keyhole slot 38 in the web of the shoe 20. Each anchor is thereby adapted to resist movement of the shoe in one direction only and to permit free movement of the shoe in the opposite direction, the slot 38 being provided sufficiently long to permit any movement which might ever be required.

In a preferred form of the brake the anchor pivot 34 is displaced towards the center of the brake with respect to the grooved crank end 36, thus providing a tendency for the shoe to quickly release itself and further advantages which will be described hereinafter.

In order to spread the shoes into drum engagement, novel actuating means as shown may be provided comprising a lever 40 pivoted to the shoe 22 at 42 and thrusting an adjustable strut 44 which slottedly engages the shoe 20 at 46. A cable 48 passing through the outlet 50 in the backing plate 11 may preferably be employed for brake actuation. The preferred details of the lever and strut are best shown in Figure 2 wherein the lever 40 is shown as comprising stampings 41 and 43 which actuate through the pin 45, the U-shaped end of the internally threaded adjustment member 52, and as may be seen the web of the shoe 22 is provided with a slot 54 sufficiently long for the pin 45 to move freely in actuating the brake. An externally threaded member 56 carrying a knurled or notched wheel 58 is shown in threaded engagement with the member 52, and swivelly mounted in the socket 60 which is slotted at 46 to engage the web of the shoe 20. A spring clip 62 secured to the pin 45 and having ears 64 wrapped around the member 52 is adapted to engage the knurled or notched wheel 58 and prevent undesired rotation thereof.

The adjustment link 24 is similar to 44 in that it includes an internally threaded member 64' having notched engagement with the shoe flange 20 and in which is threaded the externally threaded member 66 provided with a notched wheel 68. A swivel socket 69 in notched engagement with the shoe 22 is adapted to swivelly receive the other end of the externally threaded member 66. The spring 70 serves the dual function of preventing undesired adjustment, by engaging the notched wheel 68, and retaining the shoes in compressive engagement with the adjustment link. The spring 72 also serves a dual function of retaining the other shoe ends in compressive engagement with the actuating means, and also affording a release spring. A pair of eccentrics 74 and 76 and inclined springs 78 and 80 are provided to fix the release position of the shoe 22 and normally urge the same into such position. Steady rests 82 may also be provided at suitable points as shown.

As may be seen, the shoe 22 is urged by the spring 78 into engagement with the anchor 28, and against the eccentrics 74 and 76. The shoe 20 is spaced at either end from shoe 22 by the adjustment links 44 and 24, and urged into engagement with the anchor 30 by reason of the spring 80. Thus by manipulating the four adjustments a positive release position of the shoes may be accomplished, and because of the nature of the adjustments, eccentrics and screws, which produce small adjustments with relatively large movements, an exceptionally small clearance may be adjusted, in the order of a thousandth of an inch. No heavy anchors are required to be adjusted, which due to the load carried are necessarily difficult to adjust with great accuracy.

The shoes 20 and 22 are further held in engagement with their anchors 28 and 30 by the springs 78 and 80 until such time as the shoes engage the drum and the braking torque shifted to a single anchor. Thus, no "click" due to the shoes shifting anchor under load can possibly occur.

As shown in Figure 1, the anchors are pivoted to the backing plate at a point nearer the brake center than the crank engagement with the keyhole slot in the shoe web. The amount of this difference may be varied to suit, and will be found to produce a more responsive brake since the contact of the shoe has a tendency to release the brake, or in other words, to cause the brake to closely follow the movement of the actuating mechanism. If this displacement is made great enough the brake may react directly upon the cable 48, and produce a desirable "feel" upon the cable 48, although in doing so the effectiveness of the brake may be somewhat decreased.

As illustrated in Figures 1, 4, 10 and 11 the anchors may be shifted in position in accordance with the effectiveness desired.

Since the force thrust upon the secondary shoe through connecting link 24 is greater than that of thrust link 44 due to the frictional contact of the primary shoe contacting with the rotating drum, for a perfectly neutral secondary shoe, the anchor may be placed so as to be effective somewhat below the center of the shoe. However, for equal wear on both shoes and even pressure distribution, and also greater servo action, the anchors are preferably placed as shown in Figure 1, where they are effective on points of the shoes distant from the shoe ends in inverse proportion to the tangential pressures at their ends.

Referring to Figure 4 there is shown therein a central anchor brake adapted for automatic adjustment. As illustrated the shoes 20 and 22 are connected by a link 24 which in this instance may not be adjustable. In order to make this adjustment unnecessary, the anchors 90 and 92 are located adjacent the link and below the center of the brake. The positioning of the anchors in this manner reduces the amount of adjustment which could be made in the link 24, if adjustment were provided, and reduces it to such an extent as to make it unnecessary. The construction of the anchor in this instance may be such as is shown in detail in Figure 8 and comprises an offset or eccentric anchor part 94 which may be initially adjusted, and a pair of slotted links 96 in floating engagement with the anchor and pivotally connected with the shoe web as at 98. The slots afford anchorage for one direction of rotation, but provide clearance for floating movement during rotation in the opposite direction.

The actuating mechanism for the brake is similar to Figure 1 with the addition of automatic adjustment mechanism. The thrust member comprising an externally threaded member 100 secured to one shoe and an internally threaded member 102 threaded thereon and swivelly connected to the actuating lever 104 through the member 106, will shift during brake actuation, and the floating or shifting movement may increase in proportion to the wear of the brake shoes. To employ this floating movement for adjustment purposes, a link 108 is connected to the shoe 22 at 110, and by means of a lost motion connection 112 is adapted to actuate a bell crank lever 114 pivoted at 116 to the backing plate 11. Also pivoted at 116, free of the bell crank however, is a pawl 118 which is adapted to engage the ratchet wheel 120 mounted upon the internally threaded member 102.

A lug 122 on the lower arm of the bell crank lever 114 is adapted to engage the pawl 118, and a spring 124 is adapted to urge the pawl into engagement with the lug, and is of sufficient strength to cause the pawl to turn the ratchet wheel and follow in engagement with the bell crank lug, when the bell crank is rotated counter-clockwise. An adjustably mounted pair of stop pins 124' located above and below the pawl permit a limited movement thereof, sufficient to turn a single tooth of the ratchet wheel at a time. To prevent adjustment at such times as the brake is heated, at which time clearance not due to wear may be present, there is provided a thermostatic bar 126 secured at one end by the bracket 128 and at the other end by a lever 130 pivoted at one end to the bracket, and forked at its other end to embrace the pawl 118. Upon expansion of the thermostatic bar or element, the pawl, through rocking of the lever will be removed clear of the ratchet, thus preventing further adjustments during heated conditions.

Figure 7 is illustrative of a modified thermostatic control wherein the element 132 is supported between the backing plate and the lever 134 which lever is provided with a slot adapted to limit the movement of the pawl and also to remove the same from the ratchet upon heated brake operating conditions.

The eccentrics 74 and 76 may be provided as in Figure 4 for an initial adjustment, but location of the shoes subsequent to wear taking place is accomplished through the agency of the springs 77 and 79 which are so directed as to cause the shoes to normally center themselves. Such an arrangement is permissible in the brake structure as shown, since the wear on the primary shoe may be made substantially equal to that of the secondary shoe, so that throughout the life of the brake the shoe center line and the wearing surface center line will remain substantially coincident.

Illustrated in Figure 10 is a brake similar to that of Figure 1 adapted for hydraulic operation. In this instance a hydraulic cylinder 140 is adapted to spread the shoes 22 and 20. Since the anchors 28 and 30 are placed above the center and adjacent the cylinder, no adjustment is necessary, since the wear may be mostly compensated for by the adjustment 142 diametrically opposite the cylinder. The shoes may be provided with abutments adapted to engage the cylinder when released and eccentric 76 which will readily maintain clearance during inoperative periods. Should it be desirable to reduce the self actuating characteristics by lowering the anchors, the hydraulic cylinder may become well adapted for use with a two stage actuator such as are adapted to take up clearance until brake actuating resistance is met, after which brake application fluid pressures are employed. This is due to the lack of clearance adjustment in the cylinder, and also the lack of any particular need for such an adjustment, so long as means are provided to take up the slack, it being unnecessary to retain small clearance to prevent "click", since there can be no "click" in this construction, for the shoes cannot possibly shift their anchorage under load.

Illustrated in Figure 11 is a modified form wherein a wedge cam 150 mounted upon a lever 152 is adapted to spread the shoes 20 and 22 by pressure brought to bear on the rollers 154 and 155. In this instance since no adjustment is provided near the actuating wedge, anchors are placed adjacent thereto. A novel form of anchor comprising a flattened pin 158 secured to the backing plate is adapted to engage the U-shaped openings 160 in the brake shoes, to prevent rotation in one direction and afford lost motion in the other. A suitable adjustment 162, return springs 164, 166 and 168, steady rests 82 and eccentrics 170 may be provided in order to retain and locate the shoes in release position. As shown in Figure 12 the U-shaped openings may be reinforced by side plate 172 so as to afford a broader bearing surface upon the anchor 158.

In operation, spreading of the shoes at one end first causes the shoes to engage the brake drum, at which instant, for rotation in the direction indicated by arrows in the various figures, the shoe 22 leaves its anchor and becomes a primary shoe, actuating the secondary shoe, the anchor of which absorbs the braking torque. The force transferred to the anchor is substantially at right angles to the forces applying the secondary shoe, thus affording a substantially neutral action. Upon reverse rotation the primary and secondary shoes alter their positions and operate in a similar manner.

The automatic adjustment of Figure 4 is adapted to be actuated for one direction of rotation only and at such time as the floating movement of shoe 22 carries the slot 112 of link 108 into engagement of the bell crank. The stop pins 124' permit only a uniform movement of the pawl, thus preventing uneven increments of adjustment. This being accomplished by the resilient lug connection between the bell crank and the pawl. Permitting only small uniform increments of adjustment prevents any excessive adjustment due to momentary expansion, which might not operate the thermostatic cut out immediately due to a lag in heat flow to the thermostatic element. There is thus provided a considerable safeguard against undue adjustments which might tend to cause dragging of the brakes at subsequent normal periods.

It will accordingly be seen that the general structure disclosed involving a servo shoe and a secondary neutral shoe has many inherent advantages which permit the use of such a construction in a wide variety of ways and though several embodiments and modifications of the invention have been illustrated and described, it is to be understood that the invention is not limited thereto but may be embodied in various mechanical forms and combinations. As many changes in construction and arrangement of parts may be made without departing from the spirit of the invention, as will be apparent to those skilled in the art, reference will be had to the appended claims for a definition of the limits of the invention.

What is claimed is:

1. A brake comprising a support, a drum, a pair of substantially diametrically disposed anchors, a brake shoe swinging by a short link besides the shoe on each of said anchors, actuating means between and adjustably connecting one pair of adjacent shoe ends, and an adjustable link generally perpendicular to said links and connecting the other pair of adjacent shoe ends.

2. A brake actuating mechanism comprising in combination with a pair of adjacent shoe ends having central webs, a lever having members on either side of one shoe web and pivoted thereto, a strut having a threaded socket and members extending on either side of said web pivoted to said lever members in corresponding positions, an adjustable member threaded in said socket and swively mounted in a second socket engaging the other shoe web, and means for actuating said lever.

3. A brake comprising a drum, a pair of shoes having webs formed with openings and linked together at one end and hydraulically actuated at the other, a pair of pivotally mounted swinging anchor links associated with said shoes, each anchor link having a part extending through the opening in the web of its shoe and being effective at a point intermediate the ends of its shoe and preventing rotation of its shoe towards its hydraulically actuated end.

4. A brake comprising a drum, floating friction means including connected substantially semicircular shoes formed with webs having openings therethrough, an anchor to resist braking torque in one direction and having a part extending through the opening in the web of one of the shoes, a second anchor to resist braking torque in the other direction and having a part extending through the opening in the web of the other shoe, and means exerting a force maintaining said friction means in engagement with both anchors until counteracted by frictional force of brake engagement.

5. A brake comprising a pair of shoes linked together at one end, a mechanical actuating means at the other, an anchor for each shoe, an automatic clearance adjusting mechanism connected between the actuated ends of said shoes, means for limiting the extent of adjustment for clearance in any one operation, and means for rendering the mechanism inoperative during heated brake application.

6. In a brake having a drum and friction means, an automatic clearance adjustment mechanism operative to adjust upon each brake application and release during abnormal brake clearance conditions, said mechanism including means to restrict the adjustment to small substantially uniform increments.

7. In a brake having a drum and friction means, an automatic clearance adjustment mechanism operative to adjust upon each brake application and release during abnormal brake clearance conditions and during one direction of brake rotation only, said mechanism including means to restrict each adjustment to small substantially uniform increments.

8. In a brake having a drum and friction means, an automatic clearance adjustment mechanism operative to adjust upon each brake application and release during abnormal brake clearance conditions, said mechanism including means to restrict each adjustment to small substantially uniform increments, and a second means to render said mechanism inoperative during heated brake actuation.

9. A brake comprising a pair of shoes linked together at one end, an anchor for each shoe intermediate the shoe ends adapted to prevent movement in one direction, actuating means for spreading the pair of shoes at the other end, and a spring for urging each shoe into anchor contact until resisted by braking torque.

10. A brake comprising a shoe having a web, an aperture in said web intermediate the ends of said shoe having one edge extending radially of the brake on a slight curve, and an anchor therein having a radially-arranged flat side adapted to engage said one edge of said aperture.

11. A brake comprising a support, a crank shaped anchor pivoted to the support and adapted to engage a shoe.

12. A brake comprising a shoe, a unidirectional anchor therefor intermediate the ends of the shoe with respect to which the shoe is movable when in released position, an adjustable stationary release positioning means at each end of the shoe, means urging said shoe into engagement with said anchor and said means, and a second shoe connected at both ends to the first shoe and positioned thereby when the brake is released.

LUDGER E. LA BRIE.